United States Patent [19]

Niemczyk

[11] Patent Number: 4,594,252

[45] Date of Patent: Jun. 10, 1986

[54] METHOD FOR MAKING DIPEPTIDE SWEETENED READY-TO-EAT CEREAL

[75] Inventor: Michael J. Niemczyk, Palatine, Ill.

[73] Assignee: The Quaker Oats Company, Chicago, Ill.

[21] Appl. No.: 649,555

[22] Filed: Sep. 11, 1984

[51] Int. Cl.⁴ .................................................. A23L 1/164
[52] U.S. Cl. ...................... 426/307; 426/303; 426/601; 426/620; 426/656
[58] Field of Search .............. 426/93, 96, 99, 302, 426/303, 548, 307, 620, 656, 601

[56] References Cited

U.S. PATENT DOCUMENTS

| | | | |
|---|---|---|---|
| 851,221 | 4/1907 | Chaplin . | |
| 2,222,560 | 11/1940 | Clickner | 99/134 |
| 2,225,894 | 12/1940 | White et al. | 99/92 |
| 2,556,233 | 6/1951 | Stokla et al. | 99/140 |
| 2,785,983 | 3/1957 | McMath | 99/140 |
| 2,951,014 | 8/1960 | Garmen | 167/82 |
| 3,037,911 | 6/1962 | Stoyle et al. | 167/81 |
| 3,208,858 | 9/1965 | Crossley et al. | 99/134 |
| 3,484,250 | 12/1969 | Vollink et al. | 99/83 |
| 3,518,092 | 6/1970 | Rock et al. | 99/92 |
| 3,582,336 | 6/1971 | Rasmusson | 99/83 |
| 3,582,353 | 6/1971 | Fehr et al. | 99/86 |
| 3,582,361 | 6/1971 | Huth | 99/140 |
| 3,767,824 | 10/1973 | Keyser et al. | 426/290 |
| 3,767,825 | 10/1973 | Hammes et al. | 426/290 |
| 3,767,830 | 10/1973 | Reimer | 426/162 |
| 3,769,438 | 10/1973 | Rusch et al. | 426/99 |
| 3,793,464 | 2/1974 | Rusch | 426/89 |
| 3,796,814 | 3/1974 | Cermak | 426/98 |
| 3,814,822 | 6/1974 | Henthorn et al. | 426/293 |
| 3,819,839 | 6/1974 | Pichel | 426/93 |
| 3,840,685 | 10/1974 | Lyall et al. | 426/201 |
| 3,843,808 | 10/1974 | Ziccarelli | 426/187 |
| 3,934,047 | 1/1976 | Schade | 426/548 |
| 3,947,600 | 3/1976 | Rousseau | 426/302 |
| 3,955,000 | 5/1976 | Baggerly | 426/96 |
| 3,959,498 | 5/1976 | Lyall et al. | 426/93 |
| 3,976,794 | 9/1979 | Johnson et al. | 426/103 |
| 3,978,246 | 8/1976 | Chozianin et al. | 426/633 |
| 3,992,555 | 11/1976 | Kovacs | 426/72 |
| 3,992,556 | 11/1976 | Kovacs | 426/72 |
| 4,011,349 | 3/1977 | Riesen | 426/548 |
| 4,068,006 | 1/1978 | Moritz | 426/99 |
| 4,079,151 | 3/1978 | Schade et al. | 426/96 |
| 4,086,367 | 4/1978 | Ziccarelli | 426/98 |
| 4,104,406 | 8/1978 | Stringer et al. | 426/99 |
| 4,104,407 | 8/1978 | Stringer et al. | 426/99 |
| 4,153,737 | 5/1979 | Berg et al. | 426/548 |
| 4,211,800 | 7/1980 | Scharschmidt et al. | 426/93 |
| 4,378,377 | 3/1983 | Gajewski | 426/96 |
| 4,382,924 | 5/1983 | Berling et al. | 424/180 |
| 4,385,076 | 5/1983 | Crosby | 426/533 |

FOREIGN PATENT DOCUMENTS 9021370 7/1982 Japan .

Primary Examiner—Raymond N. Jones
Assistant Examiner—Elizabeth A. King
Attorney, Agent, or Firm—Daniel W. Latham

[57] ABSTRACT

Methods for making sweet, coated ready-to-eat cereal wherein the coated ready-to-eat cereal comprises: (a) a ready-to-eat cereal base; (b) a finely ground dipeptide sweetener, and (c) an edible fatty material having a Wiley Melting Point in the range of about 20° C. to 45° C. and an iodine value of less than about 40, wherein the dipeptide sweetener is encapsulated within the edible fatty material and attached to the surface of the ready-to-eat cereal. In a preferred embodiment, methods are described for making a ready-to-eat cereal product which offers a strong sensation of sweetness without a greasy appearance or feel.

40 Claims, No Drawings

METHOD FOR MAKING DIPEPTIDE SWEETENED READY-TO-EAT CEREAL

BACKGROUND

In the manufacture of sweetened ready-to-eat cereals, sweet coatings are commonly applied to a cereal base material, especially coatings containing the sugar sucrose.

Although sucrose has excellent organoleptic properties in cereal coating applications, it is well known that the large amounts of sucrose consumed in the typical American's diet contributes to obesity and dental caries. A recognition of this fact among consumers had led to intensive efforts in the food industry to find sweeteners to replace sucrose in many food products. One of the most successful approaches has been to replace sucrose with dipeptide sweeteners, especially sweeteners based on the amino acid L-aspartic acid. The most commercially successful of this group has been L-aspartyl-L-phenylalanine methyl ester, also known as aspartame, a sweetener approximately 200 times as sweet as sucrose and which has similar sweetness characteristics.

Incorporation of dipeptide sweeteners in food coatings is not, however, a matter of simple replacement of sucrose. Characteristic differences between dipeptide sweeteners and sucrose include reduced bulk due to its high sweetening power, instability of the sweetener molecule when incorporated in many foods and its high cost. In particular, aspartame is known to be unstable in the presence of moisture—hydrolysis of the dipeptide bond, hydrolysis of the methyl ester group and/or cyclization to diketopiperazine can occur; all of which destroy the sweetness of the aspartame molecule. Further, since aspartame is an aspartic acid based dipeptide, it has a free amine group available for browning reactions with the reducing sugars present in many foods—reactions which can proceed during storage and processing to reduce the sweetness and change the flavor of the food product.

In many known methods, dipeptide sweeteners are applied in aqueous suspension or solution to the surface of a ready-to-eat cereal in combination with other bulking or texture modifying ingredients such as dextrins or vegetable protein. These coating methods have a number of disadvantages. First, the dipeptide sweetener is unstable in the coating solution due to the presence of moisture, requiring the use of an excess of aspartame to produce the desired sweetness in the product and increasing the cost of the product. Second, during processing and long term storage of the product the dipeptide sweetener is available to react with reducing sugars present in the ready-to-eat cereal base or in the coating itself. Third, a large amount of water is required in an aqueous coating solution due to the low solubility of the dipeptide sweetener in water; excess water that can cause a collapse or shrinkage of the ready-to-eat cereal base. Fourth, the large amount of water required in the aqueous coating solution will usually require intensive drying of the coated ready-to-eat cereal product, thereby increasing its cost of manufacture. Finally, applying the dipeptide sweetener in aqueous solution can cause absorption of the sweetener into the ready-to-eat cereal base, thereby reducing the sensation of sweetness of the coated ready-to-eat cereal when it is tasted.

It is therefore an object of the present invention to provide a method for making a sweet, coated ready-to-eat cereal in which the dipeptide sweetener is stable during application.

It is also an object of the present invention to provide a method for making a sweet, coated ready-to-eat cereal in which the application of the sweetener does not cause a collapse or shrinkage of the ready-to-eat cereal.

It is also an object of the present invention to provide a method for making a sweet, coated ready-to-eat cereal which does not require costly drying of the coated ready-to-eat cereal following coating application.

It is also an object of the present invention to provide a sweet coated ready-to-eat cereal in which the dipeptide sweetener remains stable when in contact with a ready-to-eat cereal base containing reducing sugars.

It is also an object of the present invention to provide a sweet, coated ready-to-eat cereal which has a long unrefrigerated shelf life.

It is also an object of the present invention to provide a dipeptide sweetened, coated ready-to-eat cereal with a strong sensation of sweetness when tasted.

SUMMARY OF THE INVENTION

These and other objects are provided by the coated ready-to-eat cereal and method of the present invention. I have discovered a sweet, coated ready-to-eat cereal comprising (a) a ready-to-eat cereal base; (b) a finely ground dipeptide sweetener in the range of about 25 microns to 500 microns in diameter in an amount in the range of about 0.05% to 0.5% of the weight of the ready-to-eat cereal base, and (c) an edible fatty material having a Wiley Melting Point in the range of about 20° C. to 45° C. and an iodine value of less than about 40 in an amount of at least about 5 times the weight of the dipeptide sweetener, wherein the dipeptide sweetener is encapsulated within the edible fatty material and attached to the surface of the ready-to-eat cereal base.

Unexpectedly, sensory evaluations of various coatings in ready-to-eat cereals have shown that the encapsulated dipeptide sweetener coating of the present invention is as sweet or sweeter than a coating of a comparable amount of dipeptide sweetener applied from an aqueous solution without the encapsulating fatty material and yet it does not have a greasy appearance or feel and it does not give a greasy appearance when immersed in milk or a greasy taste when it is eaten.

A method for making the sweet, coated ready-to-eat cereal comprises the steps of:

(a) heating an edible fatty material to a temperature at which it is liquid, (b) dispersing a finely ground solid dipeptide sweetener in the range of about 25 microns to 500 microns in diameter into the heated fatty material in an amount in the range of about 0.5% to 7% based on the weight of the heated fatty material;

(c) applying the dispersion of sweetener onto a ready-to-eat cereal base in a quantity sufficient to provide an amount of dipeptide sweetener on the ready-to-eat cereal base in the range of about 0.05% to 0.5% based on the weight of the ready-to-eat cereal base, and (d) cooling the sweetener coated ready-to-eat cereal base to a temperature at which the fatty material is solid.

Yet another method for making the sweet, coated ready-to-eat cereal comprises the steps of:

(a) admixing a finely ground dipeptide sweetener in the range of about 25 microns to 500 microns in diameter with a finely ground edible bulking agent in a weight ratio of bulking agent to sweetener in the range of about 10:1 to 50.0;

(b) applying the sweetener admixture onto a ready-to-eat cereal base in an amount sufficient to provide an amount of dipeptide sweetener on the ready-to-eat cereal base in the range of about 0.05% to 0.5% based on the weight of the ready-to-eat cereal base;

(c) heating an edible fatty material to a temperature at which it is liquid;

(d) applying the heated fatty material onto the sweetener coated ready-to-eat cereal base in an amount of at least about 5 times the weight of the dipeptide sweetener; and (e) cooling the sweetened ready-to-eat cereal to a temperature at which the coating of edible fatty material is solid.

In a preferred mode, the heretofore described methods can provide a sweet, coated ready-to-eat cereal without a greasy appearance or feel. When an amount of encapsulating edible fatty material less than about 20% of the weight of the ready-to-eat cereal base is applied to the ready-to-eat cereal base at a temperature at least about 25° C. above the melting point of the edible fatty material, the excess edible fatty material is absorbed into the ready-to-eat cereal base. As a result, when the coated ready-to-eat cereal is cooled, the cereal surface has a non-greasy appearance and feel.

DETAILED DESCRIPTION OF THE INVENTION

The sweet, coated ready-to-eat cereal of the present invention comprises a finely ground dipeptide sweetener and an edible fatty material applied to the surface of a ready-to-eat cereal base.

The dipeptide sweetener employed in the present invention can be any of the known fat insoluble low calorie nutritive sweeteners based on the L-aspartic acid dipeptide configuration having a free amine group. For example, the dipeptide sweetener L-aspartyl-L-phenylalanine methyl ester, also known as aspartame can be used. The dipeptide sweetener is used in a finely ground, solid form, that is, in the form of discrete granules of sweetener in a particle size range of about 25 microns to about 500 microns in diameter (i.e. capable of passing through a 32 mesh Tyler Standard Sieve). Granules below about 150 microns in diameter are preferred in order to provide a uniform coating of the ready-to-eat cereal base.

The edible fatty material employed in the present invention comprises monoglycerides, diglycerides or triglycerides having acyl groups with 12 to 20 carbon atoms inclusive. Therefore, the fatty material can include glyceride molecules with fatty acid substituents such as for example lauric acid, myristic acid, palmitic acid, palmitoleic acid, stearic acid, oleoic acid and arachidic acid and mixtures thereof.

To provide a long unrefrigerated shelf life for the coated ready-to-eat cereal product, the fatty acid substituents present in the fatty material are also substantially all saturated thereby avoiding oxidative rancidity of the coating. Therefore, the Iodine Value of the fatty material employed in the present invention is less than about 40 and preferably less than about 20. By Iodine Value is meant the number of grams of iodine taken up by 100 grams of fatty material as determined by AOCS (American Oil Chemists Society) method CD1-25 or calculated from the measured fatty acid distribution.

While I do not wish to be bound by theories, I believe that the present invention is successful in providing a strong sensation of sweetness in the ready-to-eat cereal, even after the cereal has been immersed in cold milk, because the fatty material used in the present invention has a melting point in a fairly narrow range. At room temperature storage and at the temperature of cold milk, the fatty material is a solid which encapsulates the dipeptide sweetener in the form of solid granules on the ready-to-eat cereal base. The solid dipeptide sweetener then remains in locations on the surface of the ready-to-eat cereal base piece and is not absorbed into the ready-to-eat cereal base structure as it would be if it were applied in an aqueous dipeptide sweetener coating. Also, even though the solid dipeptide sweetener is on the surface of the ready-to-eat cereal, it does not dissolve immediately as cold milk is poured over the cereal since the encapsulating fatty material tends to act as a barrier to the surrounding milk and reduces the rate at which dipeptide sweetener is dissolved. But, as the ready-to-eat cereal is placed into the mouth of the consumer and chewed, the fatty material melts, bringing the solid dipeptide sweetener granules on the surface of the ready-to-eat cereal into immediate contact with the consumer's tongue, thereby giving the consumer a strong sensation of sweetness.

The fatty material of the present invention therefore has a melting point above about 20° C. and below about 45° C. and preferably above about 25° C. and below about 40° C. as measured by the well known Wiley Melting Point method or the comparable Mettler Dropping Point test.

A wide variety of natural and synthetic fatty materials and mixtures of fatty materials can be used in the present invention. Natural fats and oils such as butter fat, coconut oil, coco butter, or palm kernal oil can be used. Also, partially or completely hydrogenated triglyceride fats from for example soybean oil, corn oil, olive oil, peanut oil, sunflower seed oil and the like can be used, including fats with properties modified by interesterification and fractionation. Also, monoglycerides such as glycerol mono laurate, glycerol monomyristate and glycerol monopalmitate can be used. Also, various colorants, flavorants and other additives can be mixed with the fatty material to enhance the flavor, storage life or appearance of the ready-to-eat cereal product.

The ready-to-eat cereal base of the present invention can be any cereal based solid food material. Typically, the ready-to-eat cereal base will have been flaked, gun puffed, oven puffed, extruded or otherwise shaped or expanded to a desired shape and size, coated with any other desired materials to enhance and maintain its texture and appearance and then dried to a moisture level suitable for packaging and storage. Preferably, the cereal base has a porous surface into which excess fatty material can be absorbed.

Typically, the ready-to-eat cereal base will contain reducing sugars as part of its structure. By reducing sugars is meant the readily oxidized aldoses such as fructose, glucose, maltose, galactose, lactose, invert sugar and the like. These reducing sugars are available to react with the free amine group of the dipeptide sweetener in reactions which could reduce the sweetness of the product during its processing or long term storage.

For example, the shaped ready-to-eat cereal base preferably has a dextrin coating in an amount in the range of about 10% to 60% of the weight of the cereal base which when applied in an aqueous solution provides a texture improvement to the ready-to-eat cereal product. In addition to any reducing sugars in the cereal material itself, the dextrin coating then also contains reducing sugars that could react with the dipeptide sweetener. Typically, the dextrin employed in such a texture improving coating has a dextrose equivalent (D.E.) value (a measure of reducing sugar content) in the range of about 5 to 50 although no particular maximum or minimum D.E. value can be said to be critical to the texture improvement or essential to the operability of the present invention.

While I do not wish to be bound by theories, I believe that the success of the present invention in inhibiting the reaction between reducing sugars and the dipeptide sweetener is the result of the isolation of the dipeptide sweetener from the reducing sugars in the ready-to-eat cereal base by the edible fatty material. Therefore, in the coated ready-to-eat cereal of the present invention, the dipeptide sweetener is encapsulated within the edible fatty material. By "encapsulated" is meant that the dipeptide sweetener is in contact with and surrounded by an envelope of fatty material which separates the sweetener from the reducing sugar environment of the ready-to-eat cereal. The edible fatty material can also be the means by which the dipeptide sweetener particles are attached or secured onto the surface of the ready-to-eat cereal base during storage and transportation of the product. For example, the edible fatty material can adhere to the surface structure of the ready-to-eat cereal base and extend from the surface of the ready-to-eat cereal base to form an encapsulating envelope around the individual dipeptide sweetener granules, thereby preventing the dipeptide sweetener from being shaken off of the ready-to-eat cereal base. Regardless of the manner in which the dipeptide sweetener is attached to the ready-to-eat cereal base, however, in the present invention, the dipeptide sweetener is attached to the surface of the ready-to-eat cereal base rather than within the cereal base. By "surface" is meant the exterior boundary of the ready-to-eat cereal base piece, including the interior of pores, or fissures on the cereal base piece.

Although the coated ready-to-eat cereal of the present invention, as heretofore described, is not inherently limited to any particular amount of dipeptide sweetener, the dipeptide sweetener's relatively high cost and also its relatively great sweetening power, as a practical matter, provides the limit for the amount of dipeptide sweetener to be applied. Therefore, a range of about 0.05% to 0.5% of dipeptide sweetener on the ready-to-eat cereal base is preferred to provide an adequately sweet product in the present invention, with the percentage based on the ratio of the weight of the dipeptide sweetener to the weight of the ready-to-eat cereal base. A most preferred range for ready-to-eat cereals is about 0.10% of 0.35% of the dipeptide sweetener.

The coated ready-to-eat cereal of the present invention, as heretofore described, also requires a sufficient amount of fatty material to encapsulate the dipeptide sweetener on the ready-to-eat cereal surface. Typically, much greater amounts of fatty material are required than the amount of dipeptide sweetener in the coating. Fatty material at at least about 5 times the weight of the dipeptide sweetener is required as a sufficient encapsulating agent. The upper limit for the amount of encapsulating edible fatty material is limited by taste and texture considerations for the particular product. A preferred amount of encapsulating fatty material for ready-to-eat cereals is in the range of about 20–50 times the weight of dipeptide sweetener in the coating.

A method for making the heretofore described sweet, coated ready-to-eat cereal comprises the steps of heating the edible fatty material to a temperature at which it is liquid, dispersing the dipeptide sweetener into the heated fatty material, applying the dispersion onto the ready-to-eat cereal base and cooling the sweetened ready-to-eat cereal base sufficiently to solidify the fatty material.

The edible fatty material is first heated to a temperature at which it is liquid. Typically, a viscosity in the range of about 25 to 100 cps is preferred and can be attained at about 20° C.–80° C. above the melting point of most fatty material. However, the temperature of the fatty material should be minimized to avoid heat decomposition of the dipeptide sweetener as it is dispersed into the heated fatty material. Any method suitable for heating edible fatty material can be used.

The dipeptide sweetener, in the form of fine, solid granules in the range of about 25 microns to 500 microns in diameter (i.e. capable of passing through a 32 mesh Tyler Standard Sieve), can then be dispersed into the heated fatty material. Conventional methods known in the paste mixing art (i.e. the art of mixing solids and liquid into dispersions or emulsions) can be used. For example, when the fatty material is heated to a desired viscosity in the range of about 25 to 100 cps, it can be placed into a Waring blender. While a strong shearing stress is applied to the fatty material by the blender, dipeptide sweetener can be sifted into the fatty material. the sweetener then can be allowed to blend with the fatty material for several minutes. If desired, the resulting dispersion can then undergo additional milling or grinding to reduce the size of the sweetener granules to the size to be applied onto the ready-to-eat cereal base. Dipeptide sweetener concentrations in the dispersion are preferably concentrations in the range of about 0.5% to 7.0% since the viscosity of the dispersion becomes too great at higher concentrations to be easily applied and since the amount of fatty material in the dispersion becomes undesirably high at lower concentrations. Most preferably, concentrations in the range of about 3% to 4% are used in the present method.

The dispersion is then applied onto the ready-to-eat cereal base so that the dispersion adheres to the ready-to-eat cereal base in a substantially even distribution. A fine spray of the dispersion is a satisfactory method of application. No special equipment is required to produce the fine spray; conventional equipment of the type typically used for spraying moderately viscous liquids and slurries can be used. A sufficient amount of the dispersion is applied to provide a coating of dipeptide sweetener in an amount in the preferred range of about 0.05% to 0.5%, based on the weight of the comestible base. In spraying the ready-to-eat cereal base, the spray is preferably applied to a tumbling bed of ready-to-eat cereal base pieces in a conventional enrober to promote an even distribution of dipeptide sweetener.

Yet another method for making the sweet, coated, ready-to-eat cereal of the present invention comprises the steps of admixing the finely ground dipeptide sweetener with an edible bulking agent, applying the admixture to the ready-to-eat cereal base, heating an edible fatty material to a temperature at which it is liquid, applying the edible fatty material to the sweetener coated ready-to-eat cereal base, and cooling the sweetened ready-to-eat cereal base to a temperature at which the coating of edible fatty material is solid.

In order to provide an even distribution of dipeptide sweetener on the ready-to-eat cereal, a bulking agent or carrier is first admixed with the finely ground dipeptide sweetener. For example, a powdered dextrin can be used as a bulking agent and mixed with the dipeptide sweetener in a ratio from about 10:1 to about 50:1. Preferably, this admixture is applied to the ready-to-eat cereal base after the ready-to-eat cereal base has been enrobed with a sticky binder material although in some cases the cereal base itself could be sufficiently sticky to retain the necessary amount of dipeptide sweetener and bulking agent. For example, a sugar syrup could be enrobed onto the ready-to-eat cereal base followed by a dusting with the admixture of dipeptide sweetener and dextrin (i.e. in which particles of sweetener and bulking agent are sprinkled lightly onto the ready-to-eat cereal base by any suitable method).

The edible fatty material is then heated until it is liquid and is applied to the sweetener coated ready-to-eat cereal in an amount sufficient to encapsulate the dipeptide sweetener on the ready-to-eat cereal base. The amount of edible fatty material applied is at least about 5 times the weight of the dipeptide sweetener applied to the ready-to-eat cereal base. The edible fatty material can be applied by spraying it onto the ready-to-eat cereal base in a fine mist.

We have also discovered a preferred mode by which the ready-to-eat cereal can be made by either of the heretofore described methods without imparting a greasy appearance or feel to the final product. Generally, a temperature at least about 25° C. above the melting point of the fatty material is required to allow the fatty material to readily penetrate the surface of the ready-to-eat cereal base. Thus, applying the edible fatty material or dispersion a total amount of edible fatty material of less than about 20% based on the weight of the ready-to-eat base at a temperature of at least about 25° C. above the melting point of the fatty material and/or heating the cereal base to a temperature of at least 25° C. above the melting point of the fatty material is preferred to produce a ready-to-eat cereal without a greasy feel or appearance.

In either of the heretofore described methods, the ready-to-eat cereal base coated with dipeptide sweetener and edible fatty material is then cooled to a temperature at which the fatty material is solid and ready for packaging as a sweet, coated ready-to-eat cereal product. During the coating process, then, little or no moisture has been applied to the ready-to-eat cereal base or to the dipeptide sweetener and therefore collapse of the ready-to-eat cereal base and degradation of the dipeptide sweetener have been minimized.

In a preferred embodiment, the ready-to-eat cereal base is also coated with a dextrin coating prior to coating with the sweetener. Preferably, an aqueous solution comprising about 20% to 65% dextrin is sprayed onto the ready-to-eat cereal base and then dried to a moisture content at which the ready-to-eat cereal base is suitable for packaging and storage. A moisture content of less than about 5% is satisfactory. The sweetener coating can then be applied by the methods heretofore described.

The following examples illustrate and explain the present invention but are not to be taken as limiting the present invention in any regard.

EXAMPLE 1

Take about 2000 grams of a highly expanded ready-to-eat cereal base. Enrobe the cereal base in a conventional enrobing apparatus with 1650 grams of a syrup comprising:

15 D.E. Malto dextrin: 55%
Coconut oil: 10%
Water: 35%

Dry the enrobed cereal in a conventional drying oven to about 3% moisture, thereby providing an enrobed cereal base for an aspartame coating.

Grind fifty grams of aspartame to particles that pass through a U.S. 200 sieve. Heat 388 grams of a coconut oil having a 76° melting point to a temperature of about 180° F. and place it into a Waring blender. While the blender is applying a high shear to the heated coconut oil, slowly sift 12 grams of the ground aspartame into the oil and allow it to blend with the oil for several minutes.

Spray a fine mist of about 210 grams of the resulting dispersion at about 140° F. onto the enrobed cereal base as it is tumbled in an enrober. Then cool the sweetener sprayed cereal base to room temperature, thereby making a sweet, coated cereal product.

EXAMPLE 2

Take 2,000 grams of a highly expanded ready-to-eat cereal base. Enrobe the ready-to-eat cereal base with 500 grams of a sugar syrup comprising:

Sugar: 64.8%
Salt: 1.0%
Vitamins: 0.2%
Water: 34.0%

Mix 4 grams of 150 micron aspartame granules with 96 grams of a malto dextrin powder. Dust the moist, enrobed ready-to-eat cereal base with the aspartame/malto dextrin mixture. Dry the enrobed cereal base in a convection oven at about 120° C. for 3–5 minutes to bring the moisture content of the enrobed cereal to less than about 5%.

Heat 50 grams of coconut oil to a temperature of about 140° F. and spray it onto a tumbling bed of sweetener coated ready-to-eat cereal pieces in a conventional rotating drum enrober.

The oil coated cereal pieces are then allowed to cool.

Although the above description and examples of the invention are disclosed herein for the purpose of describing the invention to those with ordinary skill in the art, each and every modification and variation of the invention is not described in detail. It is intended, however, that all modifications and variations which are evident to persons skilled in the art are to be included within the scope of the invention.

I claim:

1. A method for making a sweetener coated ready-to-eat cereal comprising the steps of:
   (a) heating an edible fatty material having a Wiley Melting Point in the range of about 20° C. to 45° C. and an iodine value of less than about 40 to a temperature at which it is liquid;
   (b) dispersing a finely ground solid dipeptide sweetener in the range of about 25 microns to 500 microns in diameter into the heated fatty material in an amount in the range of about 0.5% to 7.0% based on the weight of the fatty material;
   (c) applying the dispersion of sweetener and fatty material onto a ready-to-eat cereal base heated to a temperature of at least about 25° C. above the melting point of the edible fatty material and in a quantity sufficient to provide an amount of dipeptide sweetener on the ready-to-eat cereal base in the range of about 0.05% to 0.5% based on the weight of the ready-to-eat cereal base; and (d) cooling the sweetened ready-to-eat cereal to a temperature at which the fatty material is solid.

2. The method of claim 1 wherein the dipeptide sweetener has granule diameter of less than about 150 microns.

3. The method of claim 1 wherein an amount of dipeptide sweetener in the range of about 3% to 4% based on the weight of the heated fatty material is dispersed into the heated fatty material.

4. The method of claim 1 wherein the dispersion of sweetener and fatty material is sprayed onto a tumbling bed of ready-to-eat cereal base pieces.

5. The method of claim 1 wherein the dispersed sweetener is applied to the ready-to-eat cereal base at a temperature of at least about 25° C. above the melting point of the edible fatty material.

6. The method of claim 1 wherein the amount of fatty material applied to the ready-to-eat cereal base is less than about 20% by weight.

7. The method of claim 1 further comprising the steps of: applying an aqueous dextrin solution to the ready-to-eat cereal base and drying the ready-to-eat cereal base and dextrin coating to a moisture content at which the coated ready-to-eat cereal base can be packaged and stored.

8. The method of claim 7 wherein the aqueous dextrin solution has a dextrin concentration in the range of about 20% to 65%.

9. The method of claim 7 wherein the dextrin has a dextrose equivalent value in the range of about 5 to 50.

10. The method of claim 7 wherein sufficient dextrin solution is applied to provide a dextrin content in the ready-to-eat cereal base of about 10% to 60%.

11. A method for making a sweet, coated ready-to-eat cereal comprising the steps of:

(a) admixing a finely groud dipeptide sweetener in the range of about 25 microns to 500 microns in diameter with a finely groud edible bulking agent in a weight ratio of bulking agent to sweetener in the range of about 10:1 to 50:1;

(b) applying the sweetener admixture onto a ready-to-eat cereal base in an amount sufficient to provide an amount of dipeptide sweetener on the ready-to-eat cereal base in the range of about 0.05% to 0.5% based on the weight of the ready-to-eat cereal base (c) heating an edible fatty material having a Wiley Melting Point in the range of about 20° C. to 45° C. and an iodine value of less than about 40 to a temperature at which it is liquid;

(d) applying the heated fatty material onto the sweetener coated ready-to-eat cereal base heated to a temperature of at least about 25° C. above the melting point of the edible fatty material and in an amount of at least 5 times the weight of the dipeptide sweetener; and (e) cooling the sweetened ready-to-eat cereal to a temperature at which the coating of edible fatty material is solid.

12. The method of claim 11 wherein the dipeptide sweetener has a granule diameter of less than about 150 microns.

13. The method of claim 11 wherein the bulking agent is a malto dextrin.

14. The method of claim 11 further comprising the step of applying a sticky binder material to the ready-to-eat cereal base prior to applying the sweetener admixture.

15. The method of claim 11 wherein the edible fatty material is applied to the ready-to-eat cereal base at a temperature of at least about 25° C. above the melting point of the edible fatty material.

16. The method of claim 11 wherein the amount of fatty material applied to the ready-to-eat cereal base is less than about 20% by weight.

17. The method of claim 11 further comprising the steps of: applying an aqueous dextrin solution to the ready-to-eat cereal base and drying the ready-to-eat cereal base and dextrin coating to a moisture content at which the coated ready-to-eat cereal base can be packaged and stored.

18. The method of claim 17 wherein the aqueous dextrin solution has a dextrin concentration in the range of about 20% to 65%.

19. The method of claim 17 wherein the dextrin has a dextrose equivalent value in the range of about 5 to 50.

20. The method of claim 17 wherein sufficient dextrin solution is applied to provide a dextrin content in the ready-to-eat cereal base of about 10% to 60%.

21. A method for making a sweetener coated ready-to-eat cereal comprising the steps of:

(a) applying an aqueous dextrin solution to a ready-to-eat cereal base;

drying the ready-to-eat cereal base and dextrin;

(b) heating an edible fatty material having a Wiley Melting Point in the range of about 20° C. to 45° C. and an iodine value of less than about 40 to a temperature at which it is fluid;

(c) dispersing a finely ground solid dipeptide sweetener in the range of about 25 microns to 500 microns in diameter into the heated fatty material in an amount in the range of about 0.5% to 7.0% based on the weight of the fatty material;

(d) applying the dispersion of sweetener and fatty marterial onto the ready-to-eat cereal base in a quantity sufficient to provide an amount of dipeptide sweetener on the ready-to-eat cereal base in the range of about 0.05% to 0.5% based on the weight of the ready-to-eat cereal base; and (e) cooling the sweetened ready-to-eat cereal to a temperature at which the fatty material is solid.

22. The method of claim 21 wherein the dipeptide sweetener has a granule diameter of less than about 150 microns.

23. The method of claim 21 wherein an amount of dipeptide sweetener in the range of about 3% to 4% based on the weight of the heated fatty material is dispersed into the heated fatty material.

24. The method of claim 21 wherein the dispersion of sweetener and fatty material is sprayed onto a tumbling bed of ready-to-eat cereal base pieces.

25. The method of claim 21 wherein the dispersed sweetener is applied to the ready-to-eat cereal base at a temperature of at least about 25° C. above the melting point of the edible fatty material.

26. The method of claim 21 wherein the sweetened cereal base is heated to a temperature of at least about 25° C. above the melting point of the edible fatty material.

27. The method of claim 21 wherein the amount of fatty material applied to the ready-to-eat cereal base is less than about 20% by weight.

28. The method of claim 21 wherein the aqueous dextrin solution has a dextrin concentration in the range of about 20% to 65%.

29. The method of claim 21 wherein the dextrin has a dextrose equivalent value in the range of about 5 to 50.

30. The method of claim 21 wherein sufficient dextrin solution is applied to provide a dextrin content in the ready-to-eat cereal base of about 10% to 60%.

31. A method for making a sweet, coated ready-to-eat cereal comprising the steps of:
(a) applying an aqueous dextrin solution to a ready-to-eat cereal base;
(b) drying the ready-to-eat cereal base and dextrin;
(c) admixing a finely ground dipeptide sweetener in the range of about 25 microns to 500 microns in diameter with a finely ground edible bulking agent in a weight ratio of bulking agent to sweetener in the range of about 10:1 to 50:1;
(d) applying the sweetener admixture onto the ready-to-eat cereal base in an amount sufficient to provide an amount of dipeptide sweetener on the ready-to-eat cereal base in the range of about 0.05% to 0.5% based on the weight of the ready-to-eat cereal base;
(e) heating an edible fatty material having a Wiley Melting Point in the range of about 20° C. to 45° C. and an iodine value of less than about 40 to a temperature at which it is fluid;
(f) applying the heated fatty material onto the sweetener coated ready-to-eat cereal base in an amount of at least 5 times the weight of the dipeptide sweetener; and
(g) cooling the sweetened ready-to-eat cereal to a temperature at which the coating of edible fatty material is solid.

32. The method of claim 31 wherein the dipeptide sweetener has a granule diameter of less than about 150 microns.

33. The method of claim 31 wherein the bulking agent is a malto dextrin.

34. The method of claim 31 further comprising the steps of applying a sticky binder material to the ready-to-eat cereal base prior to applying the sweetener admixture.

35. The method of claim 31 wherein the edible fatty material is applied to the ready-to-eat cereal base at a temperature of at least about 25° C. above the melting point of the edible fatty material.

36. The method of claim 31 wherein the sweetened cereal base is heated to a temperature of at least about 25° C. above the melting point of the edible fatty material.

37. The method of claim 31 wherein the amount of fatty material applied to the ready-to-eat cereal base is less than about 20% by weight.

38. The method of claim 31 wherein the aqueous dextrin solution has a dextrin concentration in the range of about 20% to 65%.

39. The method of claim 31 wherein the dextrin has a dextrose equivalent value in the range of about 5 to 50.

40. The method of claim 31 wherein sufficient dextrin solution is applied to provide a dextrin content in the ready-to-eat cereal base of about 10% to 60%.

* * * * *